Patented Jan. 4, 1938

2,104,695

UNITED STATES PATENT OFFICE 2,104,695

MANUFACTURE OF HALOGENATED DERIVATIVES OF METHANE

Wilfrid Wilson Gleave, Widnes, England, assignor to Imperial Chemical Industries Limited, a corporation of Great Britain No Drawing. Application October 6, 1936, Serial No. 104,333. In Great Britain October 8, 1935

19 Claims. (Cl. 260—166)

This invention relates to a process for the manufacture of halogenated derivatives of methane and more particularly to the manufacture of chloro-fluoro derivatives thereof.

A known method of preparing chloro-fluoro methane comprises the addition of a mixture of anhydrous hydrogen fluoride, chlorine and carbon disulfide to antimony pentachloride. The antimony pentachloride is a liquid at ordinary temperatures and is subject to volatilization. Furthermore, it is an active chlorinating agent.

It has now been found that fluoro derivatives of methane may be prepared by passing carbon disulfide, hydrogen fluoride and a halogen other than fluorine, for example, chlorine or bromine, over a non-volatile heavy metal halide, such as copper or iron chloride, or mixtures of such halides, at elevated temperatures, and separating the products by fractional distillation or otherwise.

The product obtained by this process is normally a mixture of fluoro-derivatives with unchanged reactants and by-products of the reaction, e. g. hydrogen sulphide and the appropriate hydrohalide, such as HCl, and the constitution of the mixture will vary with the proportion of the individual reactants and with the temperature at which the reaction is carried out. Thus, if an excess of hydrogen fluoride and the halogen are present, the proportion of hydrogen sulphide in the product is negligible, while with a deficit of this reactant, hydrogen sulphide is formed and has to be removed by absorption in alkali or otherwise and the proportion of more highly fluorinated derivatives tends to increase with increased temperatures.

In a preferred embodiment of the invention therefore I use an excess of both halogen and the hydrofluoric acid whereby the formation of hydrogen sulfide is inhibited, and the sulphur is converted to sulfur chloride with simultaneous formation of hydrochloric acid, both of which can be separated from the other products without interference with the process. However with increasing quantities of hydrofluoric acid the proportion of halogen derivatives of methane containing several fluorine atoms will tend to increase, and if, say, monofluorotrichloromethane is required, it may be desirable not to use a notable excess of hydrofluoric acid, and to inhibit the formation of undesirable sulphur compounds by a further increase in the proportion of the halogen.

The following examples illustrate but do not limit the invention.

Example 1

In the production of dichlorodifluoromethane I find that a suitable composition of gases is between 20–35 parts by weight of carbon disulphide, 4–8 parts of hydrofluoric acid and about 20–50 parts of the halogen chlorine. This mixture can be made, for example by bubbling hydrofluoric acid through a vessel containing carbon disulphide and then introducing chlorine into the mixed vapour stream so produced. It will, of course, be necessary to heat the carbon disulphide to above 19° C., the boiling point of the hydrofluoric acid, and variations in the composition of the mixed vapour stream can be achieved by altering the amount of heating; I find that for the above limits of composition of the gases a temperature between 30–40° C. is suitable. The flow of hydrofluoric acid and chlorine can, of course, be checked by suitable meters, or by periodically weighing the containers. The mixed gases are then passed over the catalyst, suitably coke impregnated with 10 per cent chromium fluoride or copper chloride; with the latter catalyst a reaction temperature of about 300° C. is suitable, but with the former it is possible to use higher temperatures, e. g. 450–500° C., without any risk of fusing the catalyst. The time of contact is not critical, but I find that about 10 seconds is suitable. The gases are next cooled to about 0° C. to separate the major part of the unreacted carbon disulphide, together with sulphur monochloride and/or sulphur; some monofluorotrichloromethane will also be condensed. The gases are then washed free from acids and remaining chlorine with alkali, dried and condensed. If desired the sulphur chloride can be removed separately by cooling to, say 50° C. first of all, and then cooling further to separate the residual carbon disulphide etc. In either case the condensate containing carbon disulphide can be returned to the container for the latter for re-use; sulphur and/or sulphur chloride will in that case accumulate in the system and periodic purging will be necessary at intervals determined largely by the vapour pressure of the contents of the carbon disulphide container. In an alternative method the preliminary condensation to 0° C. may be omitted, and carbon disulphide and all the fluorine derivatives condensed out together and separated in a subsequent distillation process.

Example 2

A mixture of one part carbon disulphide, two parts hydrofluoric acid and one part chlorine by volume, was passed over copper chloride at 200° C. The gases were washed with caustic soda and collected over water. On analysis the gas was found to consist of a mixture of chlorofluoromethanes and unchanged carbon bisulphide. The chlorofluoromethane present in a predominating proportion was dichlor-difluoro-methane. This was isolated from the mixture by cooling and fractional distillation.

Example 3

A mixture of 26 parts carbon disulphide, 5 parts of hydrofluoric acid and 27 parts chlorine by weight, was passed over coke impregnated with copper chloride at 300° C. The gases were cooled to 0° C., washed with caustic soda, dried with sulphuric acid, and condensed at about —80° C.

The condensed gases had the following composition:—

| | Parts by weight |
|---|---|
| $CF_2Cl_2$ | 34.85 |
| $CFCl_3$ | 63.84 |
| $CS_2$ | 1.30 |

$CFCl_3$ is worked up to $CF_2Cl_2$ by recirculation through the catalyst with further quantities of hydrofluoric acid.

Example 4

A mixture of 31 parts carbon disulphide, 6 parts hydrofluoric acid and 45 parts chlorine by weight, was passed over coke impregnated with chromium fluoride, at a temperature of 450° to 500° C. The gases were cooled to 0° C., washed with caustic soda, dried with sulphuric acid, and condensed at about —80° C. The gases had the following composition:

| | Parts by weight |
|---|---|
| $CF_3Cl$ | 3.40 |
| $CF_2Cl_2$ | 53.56 |
| $CFCl_3$ | 42.82 |
| $CS_2$ | 0.22 |

The $CFCl_3$ was recirculated over the catalyst with further quantities of hydrofluoric acid for conversion to $CF_2Cl_2$.

It will be understood that it is greatly preferable to use materials for the construction of the apparatus which are not attacked appreciably by the reactants or the products of the reaction, and in particular by the hydrofluoric acid. Thus silica and the like are unsuitable either as materials of construction or as catalyst supports. I find that for the former purpose nickel is suitable, while graphite can be used for the catalyst chamber.

Examples of the catalysts which may be used in my invention include the chlorides and bromides of barium and strontium, ferric chloride, copper chloride, copper bromide, chromium fluoride, and zinc chloride. The catalysts are best used in a supported form, using any suitable inert carrier for preparing the catalytic mass, e. g. coke, but it is also possible to carry out my invention by passing the reactants through a catalyst in molten form, e. g. through molten zinc chloride. If desired, a catalytic material of lower melting point may be produced by fusing together two or more salts, one or more of which are catalysts for the reaction, e. g. a mixture of zinc chloride and ferric chloride containing 69% of the former and melting at about 215° C. Preferably, however, I use a catalyst on a support of coke or the like, and choose a heavy metal salt, e. g. chromium trifluoride on porous ignited aluminum oxide which is also known to catalyze the reaction between hydrofluoric acid and the halogen derivatives of methane containing at least one atom of halogen other than fluorine per molecule. It is then possible to increase the yield of halogen derivatives of methane containing several fluorine atoms per molecule, by separating insufficiently fluorinated derivatives from the products of the reaction, and contacting them again with the catalyst and further quantities of the reactants; part of the excess hydrofluoric acid then reacts with the insufficiently fluorinated derivatives of methane, and an increased yield of the more highly fluorinated product is obtained.

Quite a wide range of temperatures may be used in my invention, according to the type and nature of the catalyst, and the particular derivative which it is desired to prepare. When using a supported catalyst, such as coke impregnated with copper chloride, the upper temperature limit is determined by the melting point of the catalytic mass, while some reaction occurs with temperatures as low as 200° C. On the other hand, with a catalyst intended to be used in the molten state, the reaction must be conducted above the temperature at which the catalyst is liquid, but below that at which appreciable volatilization of the catalyst, or one component of it, can occur.

The herein described process has the advantages that the catalyst is a solid under the temperature and pressure conditions utilized and that it is non-volatile. As a result the catalyst is not volatilized by the vapors passing thereover.

At temperatures only slightly above the vaporization point of carbon disulphide, the reaction takes place at an uneconomical rate. It is, therefore, preferred to operate at higher temperatures preferably in the neighbourhood of 200–400° C. Extremely high temperatures are undesirable because of decomposition of the components of the gaseous mixture. Temperatures above 650° C. have not been found desirable.

I claim:

1. The process of preparing completely halogenated fluoromethanes containing halogen other than fluorine which comprises passing a gaseous mixture of carbon disulphide, hydrogen fluoride, and a halogen other than fluorine over a halide of a metal of the group consisting of iron, cobalt, nickel, copper, barium, strontium, chromium and zinc.

2. The process of preparing completely halogenated fluoromethanes containing halogen other than fluorine which comprises passing a gaseous mixture of carbon disulphide, hydrogen fluoride and chlorine over a halide of a metal of the group consisting of iron, cobalt, nickel, copper, barium, strontium, chromium and zinc at a temperature of 200° C. or higher.

3. The process of preparing completely halogenated fluoro-methanes containing halogen other than fluorine which comprises passing a gaseous mixture of carbon disulphide, hydrogen fluoride and chlorine over copper chloride at a temperature of 200° C. or over.

4. The process of preparing di-chloro-difluoro-methane which comprises passing a gaseous mixture of carbon disulphide, hydrogen fluoride and chlorine over copper chloride at a temperature of 200° C. or over.

5. The process of preparing completely halogenated fluoro-methanes containing halogen other than fluorine which comprises passing a gaseous mixture of carbon disulphide, hydrogen fluoride and chlorine over chromium chloride at a temperature of from 450°–500° C.

6. The process of preparing monofluorotrichloro methane which comprises passing a gaseous mixture of carbon disulphide, hydrogen fluoride and chlorine over chromium fluoride at a temperature of 450°–500° C.

7. A process as claimed in claim 1 where the completely halogenated fluoromethanes are isolated by a process which comprises cooling to a temperature below the boiling point of carbon disulphide and above the boiling point of the fluoromethane, removing the liquids, washing the gases with alkali and then drying the gases.

8. A process as claimed in claim 1 where the completely halogenated fluoromethanes are isolated by a process which comprises cooling to a temperature between the boiling points of the carbon disulphide and sulphur dichloride, removing the liquid, cooling further to a temperature between the boiling points of carbon disulphide and fluoromethanes, again removing the liquid, washing the gases with alkali and then drying the gases.

9. A process as claimed in claim 4 where the completely halogenated fluoromethanes are isolated by a process which comprises cooling to a temperature below the boiling point of carbon disulphide and above the boiling point of the fluoromethane, removing the liquids, washing the gases with alkali and then drying the gases.

10. A process as claimed in claim 4 where the completely halogenated fluoromethanes are isolated by a process which comprises cooling to a temperature between the boiling points of the carbon disulphide and sulphur dichloride, removing the liquid, cooling further to a temperature between the boiling points of carbon disulphide and fluoromethane, again removing the liquid, washing the gases with alkali and then drying the gases.

11. A process as claimed in claim 6 where the completely halogenated fluoromethanes are isolated by a process which comprises cooling to a temperature below the boiling point of carbon disulphide and above the boiling point of the fluoromethane, removing the liquids, washing the gases with alkali and then drying the gases.

12. A process as claimed in claim 6 where the completely halogenated fluoromethanes are isolated by a process which comprises cooling to a temperature between the boiling points of the carbon disulphide and sulphur dichloride, removing the liquid, cooling further to a temperature between the boiling points of carbon disulphide and fluoromethanes, again removing the liquid, washing the gases with alkali and then drying the gases.

13. Process of manufacturing more highly fluorinated, completely halogenated methanes from less highly fluorinated completely halogenated methanes which comprises passing a gaseous mixture of the said less highly fluorinated methane, carbon disulphide, hydrogen fluoride and a halogen other than fluorine over a halide of a metal of the group consisting of iron, cobalt, nickel, copper, chromium and zinc.

14. A process as claimed in claim 13, which is carried out at a temperature between 200° C. and 650° C.

15. A process of preparing dichlorodifluoromethane which comprises passing a gaseous mixture of trichloromonofluoromethane, carbon disulphide, hydrogen fluoride and chlorine over copper chloride at a temperature of 200° C. to 650° C.

16. A process of manufacturing more highly fluorinated completely halogenated methanes from less highly fluorinated completely halogenated methanes which comprises passing a gaseous mixture of the said less highly fluorinated methanes, carbon disulphide, hydrogen fluoride and chlorine over chromium chloride at a temperature of from 450°–500°. C.

17. A process as claimed in claim 13 where the completely halogenated fluoromethanes are isolated by a process which comprises cooling to a temperature below the boiling point of carbon disulphide and above the boiling point of the fluoromethane, removing the liquids, washing the gases with alkali and then drying the gases.

18. A process as claimed in claim 13 where the completely halogenated fluoromethanes are isolated by a process which comprises cooling to a temperature between the boiling points of the carbon disulphide and sulphur dichloride, removing the liquid, cooling further to a temperature between the boiling points of carbon disulphide and fluoromethanes, again removing the liquid, washing the gases with alkali and then drying the gases.

19. A process of manufacturing more highly fluorinated completely halogenated methanes, which comprises passing a gaseous mixture of carbon disulphide, hydrogen fluoride and a halogen other than fluorine over a halide of a metal of the group consisting of iron, cobalt, nickel, copper, chromium and zinc, separating the less highly fluorinated completely halogenated methanes formed from the desired fluorinated completely halogenated methanes and repassing the said less highly fluorinated methanes over the said metal halide in admixture with carbon disulphide, hydrogen fluoride and a halogen other than fluorine.

WILFRID WILSON GLEAVE.